United States Patent [19]

Lamour

[11] 4,133,256

[45] Jan. 9, 1979

[54] APPARATUS FOR JOINTLY ACTUATING AN ALARM AND PREPARING A HOT DRINK OR THE LIKE

[76] Inventor: Danielle M. Lamour, 19, rue du Docteur Finlay, 75015 Paris, France

[21] Appl. No.: 873,687

[22] Filed: Jan. 30, 1978

[30] Foreign Application Priority Data

Feb. 2, 1977 [FR] France ............................. 77 02708

[51] Int. Cl.² .......................................... A47J 31/52
[52] U.S. Cl. ....................................... 99/280; 99/285
[58] Field of Search ............... 99/275, 280, 285, 281, 99/282, 283

[56] References Cited

U.S. PATENT DOCUMENTS

| | | | |
|---|---|---|---|
| 2,013,172 | 9/1935 | Petrone | 99/285 |
| 2,346,389 | 4/1944 | Peters | 99/285 |
| 3,981,231 | 9/1976 | Grundy | 99/280 |
| 4,069,750 | 1/1978 | Kemp | 99/280 |

*Primary Examiner*—Robert W. Jenkins
*Attorney, Agent, or Firm*—O'Brien and Marks

[57] ABSTRACT

The apparatus comprises a stand provided with an alarm and a tank provided with an electric heating resistance. A closure device controls the pouring of the liquid from the tank into a cup. Time delay means put the heating resistance in circuit before the alarm is actuated and then open the closure device shortly before the actuation of the alarm. A device is provided for stopping the alarm under the action of a device responsive to the removal of the cup. The apparatus may be used for example for preparing hot drinks such as coffee, tea or coacoa.

10 Claims, 2 Drawing Figures

APPARATUS FOR JOINTLY ACTUATING AN ALARM AND PREPARING A HOT DRINK OR THE LIKE

The present invention relates to an apparatus for jointly actuating an alarm and preparing a hot drink or like product.

Many alarms are known which employ sound, ultrasounds, music or switch on a radio.

These apparatus are generally satisfactory for waking up a person at the required time. But the person woken up most often desires to rapidly drink a drink such as coffee or tea which must be prepared by him under bad conditions just after having been woken up. It is clear that it would be very advantageous for him to have the drink prepared automatically and ready for drinking when he is woken up.

An object of the invention is to provide an apparatus which jointly actuates the alarm and prepares a hot drink.

According to the invention, there is provided an apparatus comprising a stand provided with an alarm and a tank provided with an electric heating resistance and closure means controlling the pouring of the liquid from the tank into a vessel such as a cup, time delay means for putting the heating resistance in circuit before the actuation of the alarm and then opening the closure means a short time before the actuation of the alarm, and means for stopping the alarm under the action of means responsive to the removal of the vessel.

According to a particular embodiment of the invention, the stand may have a horseshoe shape the upper branch of which carries the tank and the lower branch of which acts as a support for the vessel.

Particularly advantageously, the circuit of the heating resistance and the circuit for actuating the alarm may have respective switches controlled by a cam driven by the mechanism of the alarm.

Preferably, the circuit controlling the closure means may be connected to the switch controlling the closure of the circuit of the heating resistance through a time delay relay.

It may also be advantageous to arrange the closure means in the form of an electrically-operated valve and the circuit for actuating the alarm be provided with a switch closed by the weight for actuating the alarm be provided with a switch closed by the weight of the vessel and forming said means responsive to the removal of the vessel.

A better understanding of the invention will be had from the ensuing description and the accompanying drawings which show an embodiment of the invention and in which.

Figure 1:
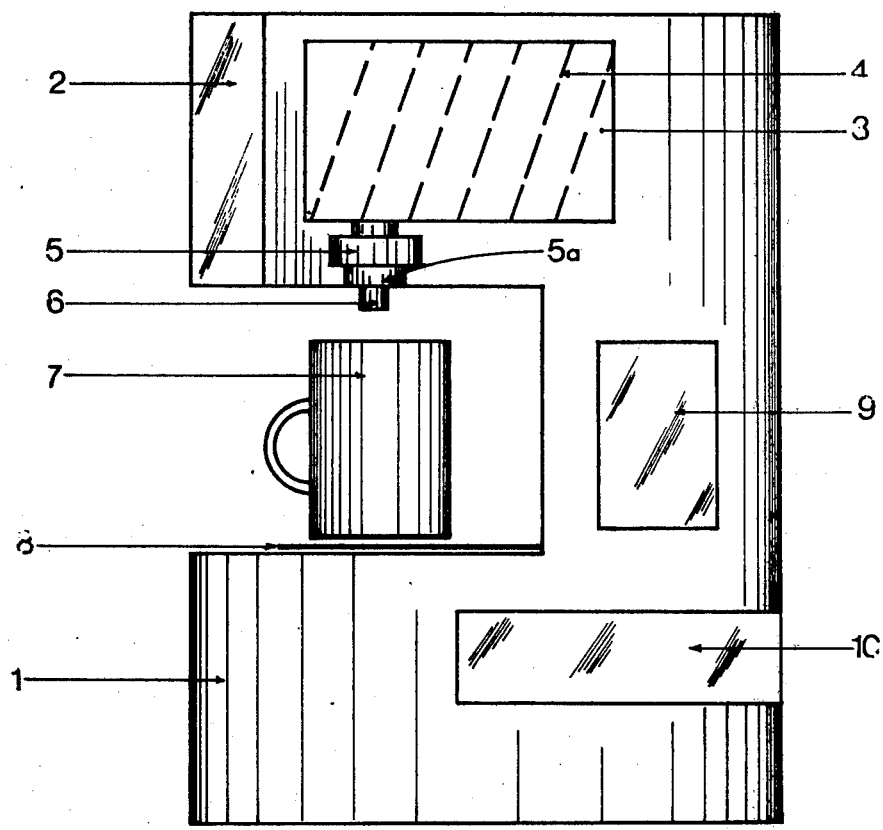
FIG. 1 is a side elevational view of the apparatus.

The apparatus illustrated in FIG. 1 serves to wake up a person and prepare a hot drink such as coffee, that this person may take as soon as he has been woken up.

This apparatus comprises essentially a stand 1 in the shape of a horseshoe. The stand is hollow and contains all the accessories for actuating the alarm and preparing the hot drink. Disposed on the upper branch of the stand 1 is an alarm 2 which may be of any type carrying an output shaft driven by the mechanism of the alarm. A cam 20 is mounted on the shaft and actuates switches 21, 22 through a boss 27 on the cam. The upper branch of the stand 1 also contains a water tank 3 provided with an electric heating resistance 4 capable of bringing the water to the required temperature for the preparation of the drink. The tank is previously filled with a measured amount of water.

Disposed at the base of the tank 3 is a closure means 5 which may be advantageously formed by an electrically-operated valve. The outlet of the closure means 5 is arranged in the form of a pouring spout 6. Means defining a cavity 5a, disposed between the closure means 5 and the pouring spout 6, contains a tablet for preparing coffee, tea or any other drink or product.

Disposed under the pouring spout 6 is a cup 7 which rests on a flexible metal strip 8. The apparatus is operated by an electrical coordination system 9 which is supplied with current by a power pack 10 which may be formed by a dry battery, an accumulator battery or a unit connected to the main supply.

Figure 2:
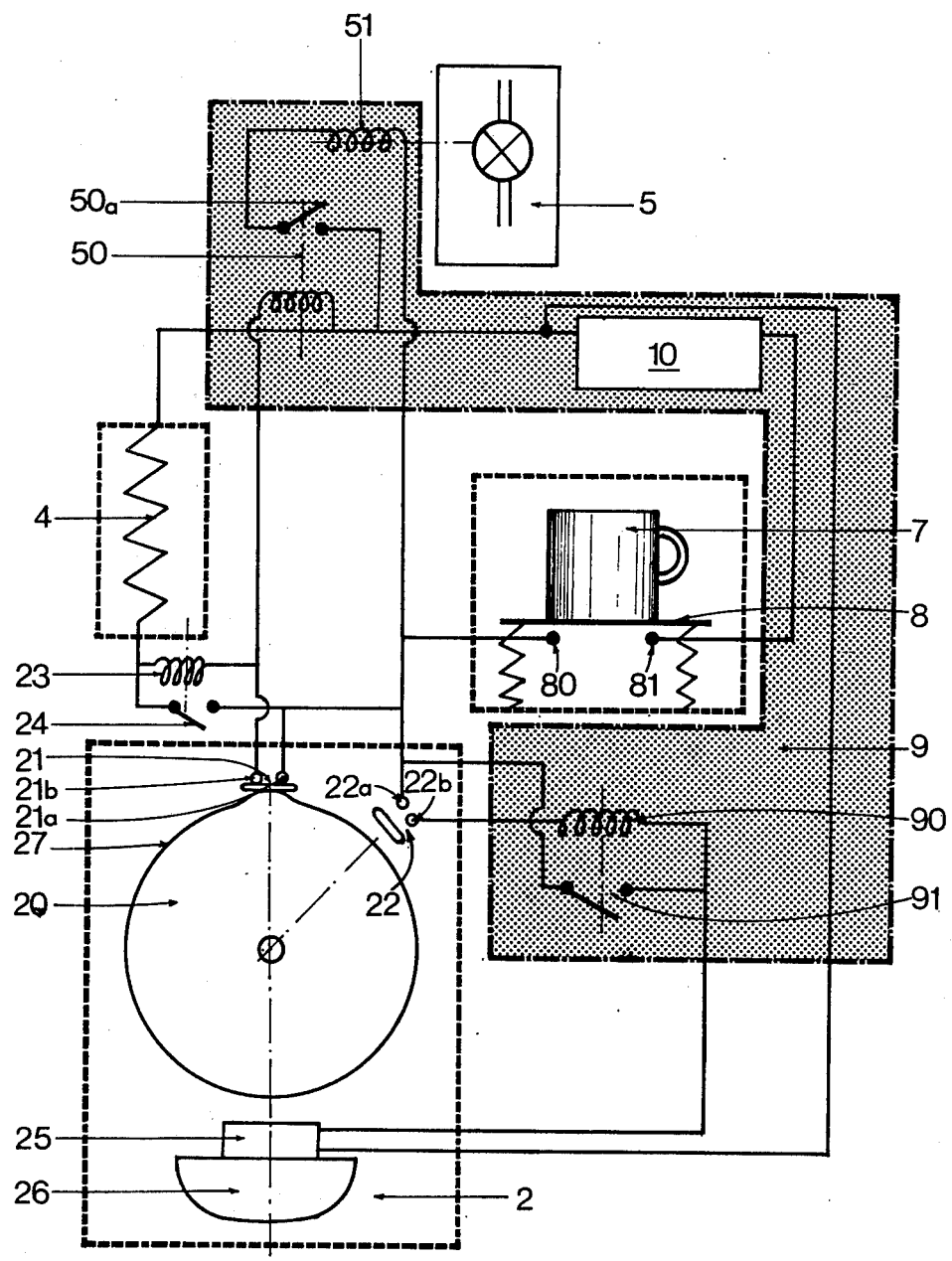
FIG. 2 is an electric circuit diagram of the apparatus.

FIG. 2 shows in the form of a diagram the construction of the various parts of the apparatus. The switch 21 is connected by one of its terminals 21a and through a maintaining coil 23 acting on a maintaining switch 24 connected, in parallel with the pack and the coil, to one of the terminals of the heating resistance coil the other terminal of which is connected to the power pack 10. The other terminal 21b of the switch 21 is also connected to the power pack 10 through a switch which is closed by the strip 8 as described hereinafter. The switch 21 is also connected through a time delay relay 50 to the winding 51 o the electrically-operated valve 5.

The switch 22 is connected by one of its terminals 22a to a terminal 80 of a switch which is closed by the flexible metal strip 8 when the cup 7 has been placed thereon. The other terminal 81 of this cup switch is connected to the power pack 10. The other terminal 22b of the switch 22 is connected, through a maintaining coil 90 acting on a maintaining switch 91, connected in parallel with the switch and the coil, to one of the terminals of the device 25 controlling the alarm 26.

The electrical coordination system 9 is surrounded by dot-dash lines in FIG. 2 and darkened by dotted shading.

The apparatus just described operates in the following manner:

Let it be assumed that the alarm must be actuated at time H. At time H-X minutes, for example H-8 minutes in the considered embodiment, the boss 27 of the cam 20 closes the switch 21. The switch 24 is then closed by the maintaining coil 23 and the current starts to flow through the heating resistance 4; the time delay relay 50 is also put in circuit and closes its switch at the end of a period Y required for heating the water. The period Y must be less than or equal to, the period X. In the considered embodiment, this period is equal to 7 minutes. When the switch 50a of the relay 50 is closed, the winding 51 of the electrically-operated valve 5 is excited and the valve opens to allow through the measured amount of water contained in the tank 3 and this water flows into the cup 7 by passing through the tablet, for preparing coffee in the considered embodiment. At time H, the boss 27 of the cam 20 closes the switch 22 which excited the maintaining coil 90 and closes the maintaining 22 which excited the maintaining coil 90 and closes the maintaining switch 91. The current then flows in the device 25 and the alarm 26 is actuated.

When the person has been woken up and takes the cup of coffee 7, the strip 8 opens the switch 80, 81. The alarm stops, the switches 24 and 91 again open, the tank is filled with water and the apparatus is ready for a new cycle of operation.

The foregoing embodiment has been given merely by way of an illustration of the invention. The alarm may be of any known type, for example the bell of the alarm may be replaced by a musical apparatus, a radio, an optical signal or the like.

Further, the electro-mechanical control be means of the cam and switches may be replaced by a fully electronic circuit.

The apparatus is capable of being employed in medical applications by using a tablet which contains a medicine which must be taken at regular intervals. If the preparation must be taken cold (antibiotics or sulfamides), the heating resistance is put out of circuit.

It is thus well understood that various modifications may be made by one skilled in the art in the devices or processes just described by way of example without departing from the scope of the invention as defined in the accompanying claims.

I claim:

1. An apparatus for jointly actuating an alarm and preparing a liquid such as a drink, comprising a stand, means for receiving a vessel, such as a cup, means responsive to the removal of said vessel from said receiving means, an alarm, means for actuating the alarm at the desired time, means for stopping the alarm combined with said reponsive means for stopping the alarm when said vessel is removed from said receiving means, a tank for receiving liquid, valve means for pouring the liquid from the tank, means for opening the valve means, an electric heating resistance within the tank for heating the liquid, an electric power supply circuit connected to the heating resistance, for heating the heating resistance, switching means inserted in said circuit for opening and closing said circuit, a pouring spout associated with the tank and located downstream of the valve means relative to the tank, means defining a cavity for receiving a product for mixing with said liquid and interposed between the valve means and the spout and time delay means combined with said switching means and said means for actuating the alarm and said means for opening the valve means for closing said switching means before actuation of the alarm and thereafter opening the valve means a short time before actuation of the alarm, the alarm being stopped by removal of said vessel.

2. An apparatus as claimed in claim 1, wherrein the means for actuating the alarm comprise a motor, a cam driven by the motor, a second electric circuit connected to the alarm and a switch inserted in the second electric circuit, the cam being associated with said switching means and said switch to close said switching means before said switch.

3. An apparatus as claimed in claim 2, wherein the two circuits comprise respective circuit maintaining means.

4. An apparatus as claimed in claim 1, wherein the means for opening the valve means comprise an electric circuit having a switch, and wherein a time delay relay associates said switching means with said switch for closing said switch a predetermined period of time after the closing of said switching means.

5. An apparatus as claimed in claim 1, wherein the valve means is an electrically-operated valve.

6. An apparatus as claimed in claim 1, wherein the means for actuating the alarm comprise a second electric circuit and a switch inserted in the second circuit and said means for receiving the vessel comprise a flexible strip associated with said switch to close said switch when said vessel is placed on said strip and open said switch when said vessel is removed from said strip and thereby constitute said responsive means.

7. An apparatus as claimed in claim 1, wherein the means for opening the valve means comprises a second electric circuit connected to said power supply circuit and said means responsive to the removal of said vessel comprise a switch which is inserted in said circuit and is opened when said vessel is removed.

8. An apparatus as claimed in claim 1, wherein said electric circuit and parts associated therewith are united in an electrical coordination system for connection to an electric power supply.

9. An apparatus as claimed in claim 8, wherein said power supply is a power pack carried by said stand.

10. An apparatus as claimed in claim 1, wherein said stand has a horseshoe shape and comprises an upper branch portion carrying said tank and a lower branch portion carrying said means for receiving said vessel.

* * * * *